Jan. 3, 1956   G. A. LYON   2,729,510
WHEEL COVER
Filed Sept. 5, 1952   3 Sheets-Sheet 1
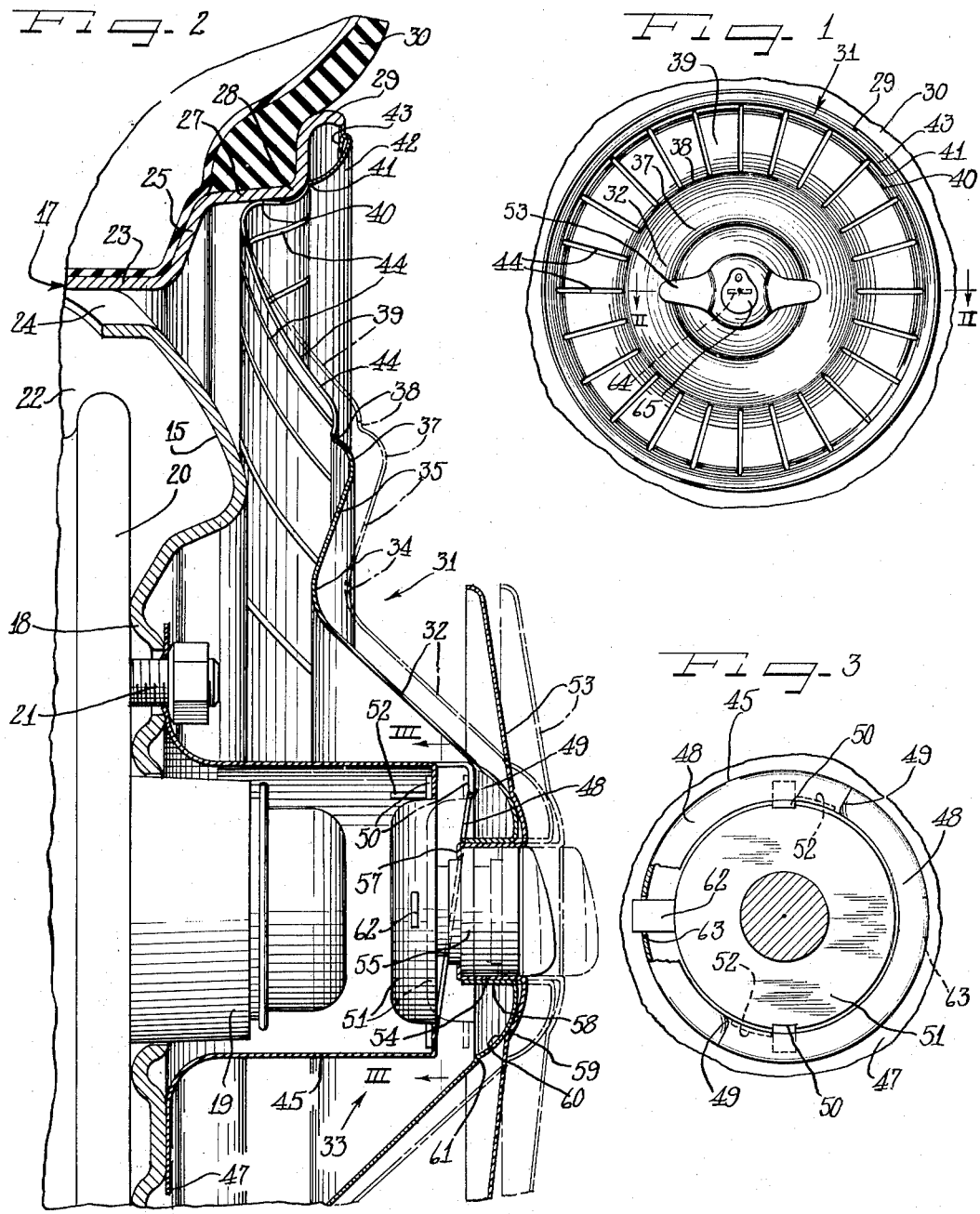
Inventor
George Albert Lyon Jan. 3, 1956 G. A. LYON 2,729,510
WHEEL COVER
Filed Sept. 5, 1952 3 Sheets-Sheet 2

Inventor
George Albert Lyon

Jan. 3, 1956  G. A. LYON  2,729,510
WHEEL COVER
Filed Sept. 5, 1952  3 Sheets-Sheet 3
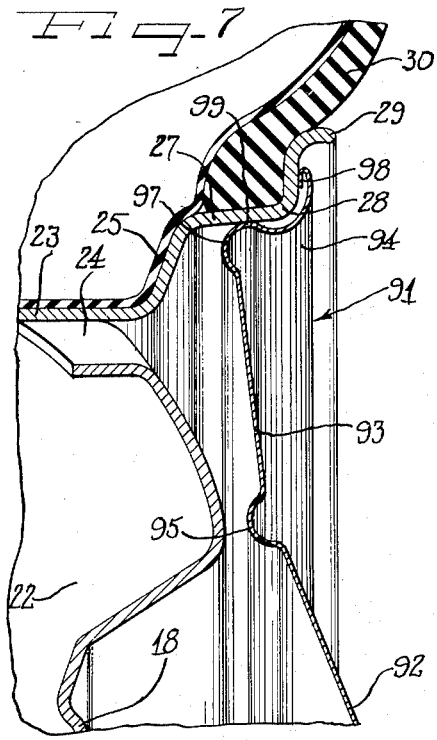
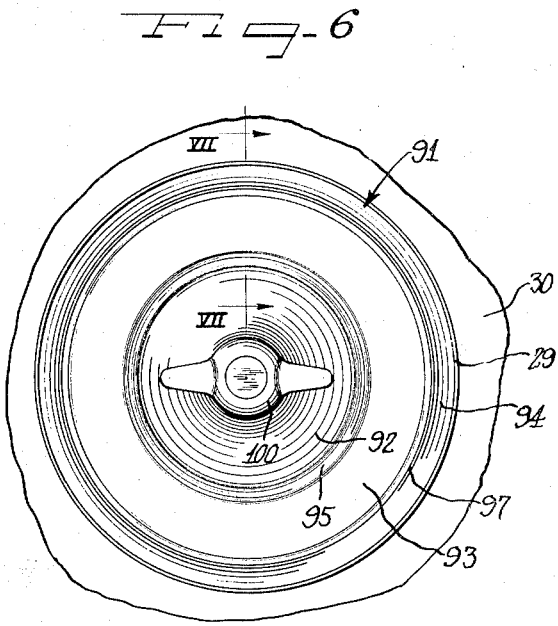
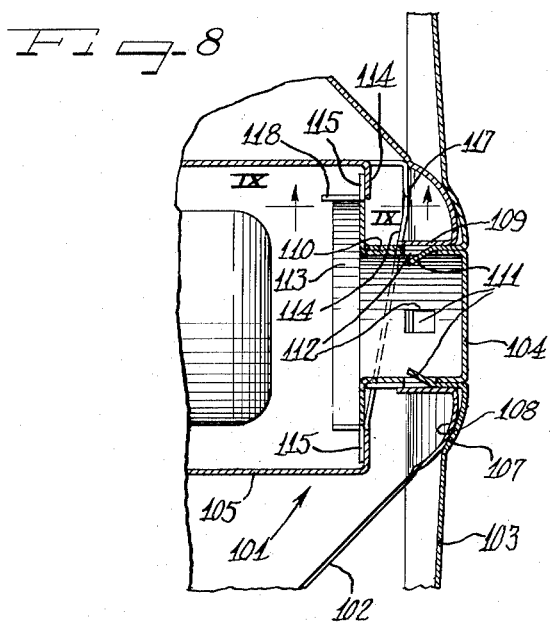
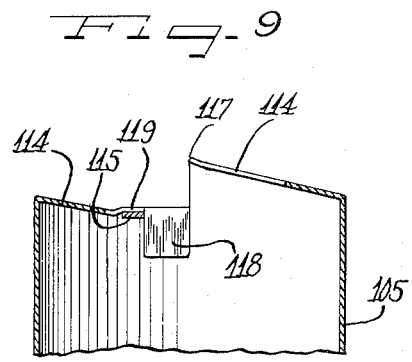
George Albert Lyon

United States Patent Office 2,729,510
Patented Jan. 3, 1956

2,729,510
WHEEL COVER
George Albert Lyon, Detroit, Mich.

Application September 5, 1952, Serial No. 308,013

17 Claims. (Cl. 301—37)

The present invention relates to improvements in wheel structures and more particularly concerns the ornamental and protective covering of the outer sides of vehicle wheels.

An important object of the present invention is to provide an improved ornamentally and protectively covered wheel structure in which substantially the entire outer side of the wheel is covered.

Another object of the invention is to provide in a vehicle wheel structure an improved cover arrangement wherein the cover is held securely in place against rattling or turning.

A further object of the invention is to provide an improved cover construction for vehicle wheels wherein attachment of the cover to the wheel is at the center of the cover, but the margin of the cover makes effective gripping engagement against the tire rim for holding the cover against tendency to turn due to torque stresses in service.

Still another object of the invention is to provide improved means in a full disk-type of cover for preventing any tendency of the outer margin of the cover to slap or chatter in service on a wheel, although the cover is secured at a central portion of the wheel.

Yet another object of the invention is to provide improved structures for effectuating the foregoing and other objects of the present invention.

Other objects, features and advantages of the present invention will be readily apparent from the following detailed description of certain embodiments thereof taken in conjunction with the accompanying drawings in which:

Figure 1 is a side elevational view of a vehicle wheel structure embodying features of the present invention;

Figure 2 is an enlarged fragmentary diametrical sectional view taken substantially along the line II—II of Figure 1;

Figure 3 is a fragmentary detail view taken substantially on the line III—III of Figure 2;

Figure 6 is an elevational view of a vehicle wheel showing a further modified form of the cover;

Figure 7 is an enlarged fragmentary radial sectional view taken substantially on the line VII—VII of Figure 6;

Figure 8 is a fragmentary transverse sectional detail view through a modified form of cover attaching structure; and Figure 9 is a fragmentary sectional detail view taken substantially on the line IX—IX of Figure 8.

As shown on the drawings:

Figure 4:
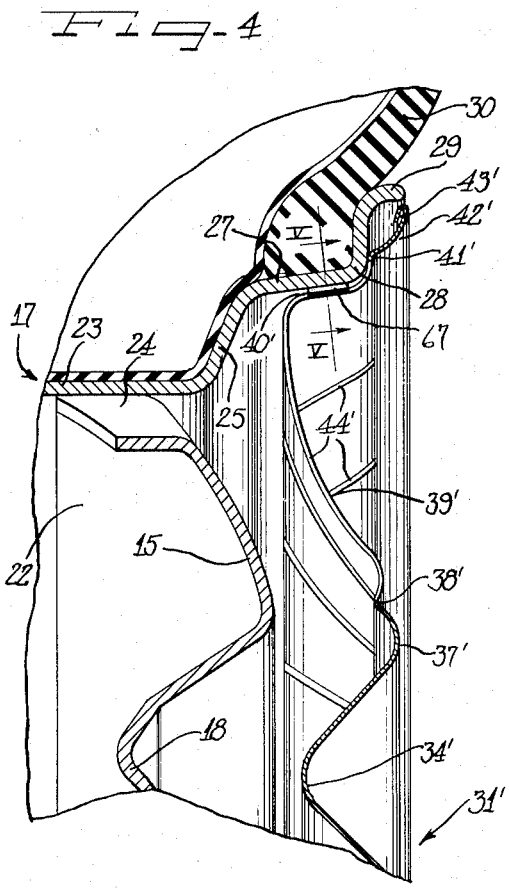
Figure 4 is a fragmentary radial sectional detail view taken through a wheel similar to Figure 2, but showing a modified form of the cover.

In all forms of the invention to be described herein, a similar vehicle wheel may be involved including a wheel body 15 and a tire rim 17. The wheel body may be of the stamped metal disk spider type including a central bolt-on flange 18 which is centrally apertured to accommodate an axle hub 19 to project therethrough. The bolt-on flange is secured to an axle hub flange 20 by means of attachment bolts 21.

At its outer margin the wheel body 15 is provided with a generally axially inwardly extending marginal attachment flange 22 secured in any suitable manner to a base flange 23 of the tire rim. At suitable intervals the base flange 22 is inset to afford air circulation openings 24 through the wheel between the attachment flange and the base flange of the tire rim.

The tire rim 17 is of the multi-flanged drop center type having at its outer side merging with the base flange 24 and extending generally radially outwardly a side flange 25. Extending generally axially outwardly and sloping slightly radially outwardly from juncture with the side flange 25 is an intermediate flange 27 which in turn merges on a juncture shoulder 28 with a terminal flange 29. The construction of the tire rim is such as to support operatively a pneumatic tire and tube assembly 30.

For covering the outer side of the wheel a novel cover structure 31 is provided. This cover may be made from a suitable thin gauge sheet metal such as stainless steel or brass that can be conveniently stamped or drawn to shape on a mass production basis and which affords a substantial degree of resiliency in the finished product. The outer side of the cover may be finished in any preferred manner such as by lustrous polishing, plating and polishing, or painting, or a combination of finishes.

By preference, the cover 31 comprises a one-piece disk body having a central portion 32 overlying the central portion of the wheel body 15 and arranged to be secured to the wheel body by attachment mechanism 33.

For instance, the cover body 32 comprises a more or less frusto-conical wide angle crown portion sloping generally radially outwardly and axially inwardly to an annular axially inwardly directed rib 34 of substantial radius from which the crown body portion angles divergently and generally radially outwardly and axially outwardly to provide an annular area 35 merging with a convex cross-sectioned annular axially outwardly projecting rib 37. At its radial outer side, the rib 37 joins angularly at a reinforcing and stiffening juncture 38 with an intermediate preferably slightly concavely cross-sectioned annular portion 39 of the cover sloping generally radially outwardly and axially inwardly. It will be observed that the central crown portion of the cover 32 and the intermediate portion 39 of the cover are of substantial width and, therefore, are reasonably resiliently flexible, while the divergent portion 35 is substantially narrower and, therefore, less flexible, while the ribs 34, 37 and 38 afford substantial stiffening structure between the central crown portion 32 and the intermediate portion 39.

The outer marginal portion of the cover 31 is so constructed and arranged that as an incident to attaching the cover at the central crown portion 32, the outer marginal portion of the cover will grippingly engage the tire rim for holding the cover against turning or rattling marginal vibration. To this end, the intermediate cover portion 39 merges convexly with a generally radially outwardly facing shoulder 40 which is of a diameter to engage the radially inwardly facing face of the intermediate flange 27 of the tire rim. This shoulder portion 40 extends generally axially and at its axially outer part is directed generally radially outwardly to provide a generally axially inwardly facing shoulder 41 engageable with the tire rim at the terminal flange side of the juncture shoulder 28 of the tire rim. From the shoulder 41, extends radially and axially outwardly an annular transversely concave convex marginal bead-like cover terminal portion 42 having an underturned finishing and reinforcing edge flange 43. It will be observed in Figure 2 that the marginal portion 42 is disposed in overlying relation to the terminal flange 29, but is spaced at its edge from the extremity of the terminal flange so as to accommodate wheel balancing weights behind said marginal portion.

The construction and relationship of the intermediate cover portion 39 is such that after the cover 31 has been initially placed in position on the wheel by engagement of the shoulder 41 against the tire rim and with the cover centered by telescoping of the shoulder portion 40 within the circumference bounded by the intermediate flange 27, pressure applied to the central portion of the cover will cause a flexible, resilient tensioning and radially outward thrusting of the cover body and more especially the intermediate portion 39 of the cover to cause the shoulder portion 40 to thrust radially outwardly into tight engagement with the intermediate flange 27 of the tire rim. The outer shoulder 41 provides a fulcrum for this action of the shoulder portion 40, in addition to the axially inward stop function of the shoulder 41.

In order to facilitate and enhance the resilient tensioning and radially thrusting action of the intermediate portion 39 and the shoulder portion 40 of the cover, these portions of the cover are preferably sub-divided by a series of radially extending slots 44 into radial sections of spoke-like arrangement which are collectively and individually flexible. In a preferred form the divider slots 44 extend from the juncture rib 38 to the shoulder 41. By this arrangement not only is flexibility imparted to the intermediate portion 39 and the shoulder portion 40 of the cover, but gripping of the shoulder portion 40 is substantially enhanced because the individual flexibility of the spoke-like portions will readily adjust to any manufacturing inaccuracies or irregularities in the engaged face of the intermediate flange 27 of the tire rim, or for that matter, in the drawn shape of the shoulder portion 40 of the cover.

In a desirable construction, the cover retaining structure 33 comprises a cover retaining, tensioning and locking arrangement. To this end, a tubular post-like adapter member 45 is provided of a large enough internal diameter to fit about the axle hub structure 19, and having a lateral base flange 47 to rest against the bolt-on flange 18 of the wheel and equipped with bolt apertures matching the bolt apertures in the bolt-on flange so that the wheel attaching bolts 21 will serve also to attach the adapter post 45 concentrically to the wheel body 15.

As best seen in Figures 2 and 3, the outer end of the adapter post is provided with a pair of symmetrically arranged inwardly directed, generally spirally sloping cam flanges 48 each of which has at its high or axially outermost end a slightly turned up entry or receiver lip 49 to facilitate engagement behind the cam flange of respective diametrically oppositely extending interengagement and take-up lugs or dogs 50 on a rotatable latching member 51 carried by the central or crown portion 32 of the cover. The arrangement is such that as an incident to centering the cover 31 on the wheel, the latching lugs 50 can be engaged behind the cam flanges 48 by turning the latch member 51 to swing the latch lugs behind the cam flanges past the entry lips 49. In Figure 2, the dash outline position of the cover and latching mechanism indicates the relative position of the cover to the adapter post 45 when the latching lugs 50 are ready to be turned into the cam flanges 48, while the full line position indicates the position of the cover after the latching member 51 has been turned to cause the latching lugs 50 to cam inwardly along the inner faces of the cam flanges 48 to draw the cover axially inwardly into tensioned, retaining engagement with the wheel. The fully tensioned condition of the cover is determined by engagement of the latching lugs 50 with respective stop flanges 52 extending axially inwardly from the inner end portions of the respective cam flanges 48.

Means for manually turning the latch member 51 comprises a handle member 53 having a tubular axially inwardly central attachment flange 54 which is secured in gripping engagement with an annularly undercut barrel extension 55 on the latching member, the inner terminal portion of the flange 54 comprising an inturned interlock flange 57 engaging a shoulder of the barrel. The tubular flange 54 extends in rotatably slidable relation through an axially inwardly directed central supporting and guide flange 58 on the cover crown 32. The handle has a hub shoulder 59 that bears axially inwardly against a central crown protuberance 60 on the crown portion of the cover immediately radially outwardly from the flange 58. In the finally tensioned, full take-up position of the cover crown, a shoulder 61 on the crown may bottom against the axially outward shoulder extremity of the adapter post 45, with the latching lugs 50 placed under tension against the cam flanges 48 for holding the crown portion of the cover against axial vibration relative to the adapter post 45.

To prevent unauthorized removal of the cover from the wheel, the latching mechanism may include a suitable key-operated lock that may be housed in the barrel 55 and the latch member 51 and including a radially protractable and retractable locking finger or tongue 62 which is preferably disposed to project from the latch member 51 midway between the two latching lugs 50, that is 80°, removed from the latching lugs. For receiving the locking finger or bolt 62 in either of the diametrically opposite positions, the wall of the hollow post member 45 is provided with suitable interlock or keeper openings 63. At its outer end, the barrel 55 has a keyhole 64 which may be protectively closed against dirt in service by means of a laterally swingable closure plate member 65. It will thus be observed that mounting and removal of the cover 31 can be easily and manually effected through the medium of the handle 53.

In mounting the cover, it is brought into centered relation to the wheel with the marginal shoulder 41 in engagement with the tire rim, and the cover is then stressed inwardly and the handle 53 turned to drive latching lugs 50 in inwardly camming engagement with the cam flanges 48 until the lugs 50 drive against the stop flanges 52, whereupon the cover will have been thoroughly axially inwardly resiliently stressed and the spoke-like portions of the intermediate part of the cover 39 will have thrust radially outwardly to drive the shoulders thereof against the intermediate flange 27 of the tire rim. Then the cover can be locked against unauthorized removal by means of a key (not shown) by which the bolt 62 is locked into the adjacent one of the keeper openings 63. Removal of the cover entails merely a reversal of the procedure just outlined. It will be observed that the plurality of radial slots 44 afford ventilation through the cover and through the wheel openings 24 behind the cover.

Figure 5:
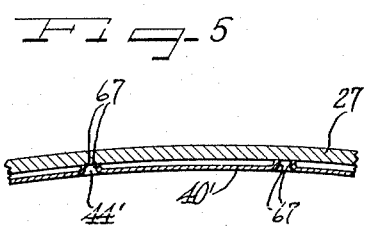
Figure 5 is a fragmentary sectional detail view taken substantially on the line V—V of Figure 4.

In the modification of Figures 4 and 5, most of the details of the cover, and all of the details of the wheel are substantially the same as shown in Figure 2 and, therefore, similar or primed reference numerals corresponding to the reference numerals in Figure 2 should be understood to indicate identical parts and the same description will apply. The principal difference in the modified cover 31' resides in the provision of generally radially outwardly directed shoulder flanges 67 at the tire rim engaging shoulder 40' to engage bitingly against the tire rim intermediate flange 27 in the stressed, mounted condition of the cover in order to afford more positive assurance against torque induced turning of the cover in service under conditions where such an expedient is desirable. The shouldering flanges are preferably formed from material struck from the separating and ventilation slots 44' and flanges 67 may, therefore, be quite narrow and stiff.

It should be understood that in the cover 31 of Figure 2 much the same anti-turn gripping can be accomplished by striking the material at the slots 44 inwardly from the cover so that the burrs resulting from the striking out of the metal will be directed toward the inside of the cover and thus provide anti-turn gripping means which will bitingly grip the surface of the intermediate flange 27 of the tire rim as an incident to radially outward thrust of the shoulder 40. The anti-turn flanges 67 of the cover 31' are, therefore, merely more emphasized and more positive anti-turn means than present on the cover 31.

In the modification of Figures 6 and 7, a wheel cover 91 is provided having a generally frusto-conically radially outwardly and axially inwardly sloping crown portion 92, an intermediate portion 93 and a marginal portion 94. An annular generally channel-shaped arcuate cross-sectioned and preferably axially inwardly directed rib 95 affords a juncture between the crown portion 92 and the intermediate portion 93. A similar generally channel-shaped axially inwardly directed, annular juncture rib 97 is provided between the intermediate portion 93 and the marginal portion 94. The marginal portion 94 is of annular, bead-like outwardly convex cross-sectioned form to fit in spaced relation about the tire rim shoulder 28 and has an outer edge underturned reinforcing and finishing flange 98 which in the assembly of the cover with the wheel bears against the terminal flange 29 and provides a stop and fulcrum for the outer margin of the cover. Where the outer marginal portion 94 joins the rib 97, a generally radially outwardly directed shoulder 99 is provided which is engageable in radially outward thrust engagement with the intermediate flange 27.

It will be observed that the intermediate portion 93 of the cover 91 is substantially straight frusto-conically on a large angle approachng a flat condition sloping axially inwardly and radially outwardly and at a flatter angle than the crown portion 92. Hence, when the crown portion 92 is pressed axially inwardly as by manipulation of a handle 100 in much the same manner as described in connection with the cover 31, and the crown poriton 92 is flexed axially inwardly, the intermediate portion 93 of the cover is also flexed and caused to exert a radially outward thrust toward the shoulder 99. During this action, the intermediate portion 93 can lever about flexible pivots provided by the ribs 95 and 97, respectively. As a result the shoulder 99 is resiliently thrust firmly against the tire rim intermediate flange 27 and holds the cover against vibrations or turning.

In Figures 8 and 9 is shown a modified cover retaining and tensioning device 101 especially adapted for service conditions where a lock is not called for, but where nevertheless adequate latching is desired. To this end, a crown portion 102 of a flexibly deflectable cover carries a rotatable manipulating handle 103 connected to a latching member 104 interengageable with a tubular adapter post member 105 which is constructed and arranged similar to the adapter post member shown in Figure 2 for attachment to the bolt-on flange of a vehicle wheel.

The handle member 103 has a thrust shoulder portion 107 bearing against a central shoulder protrusion portion 108 on the cover crown about an axially inwardly extending annular flange 109 into which is slidably directed a cylindrical axially extending flange 110 on the handle.

The latching member 104 is of generally cup shape complementary in diameter to the inner diameter of the handle flange 110 and is interlocked within the handle flange by means such as a series of inwardly bent interlock lugs 111 struck from the flange 110 and interlockingly extending into interlock apertures 112 in the wall of the member 104. Thereby the member 104 is interlocked to rotate with the handle 103.

At its inner margin, the latch member 104 is provided with an enlarged diameter providing a cylindrical flange 113 of a diameter to be received freely within and past the inner edges of a pair of symmetrically formed cam flanges 114 directed inwardly at the outer margin of the post member 105. Diametrically oppositely extending lugs 115 struck out from and directed radially beyond the flange 113 engage under resilient tension with the inner cam surfaces of the spiral cam flanges 114 by manipulation of the latching mechanism through the handle 103. Thus, when the cover is applied to the wheel, the latching arms or lugs 115 are brought to the outer or upper ends of the cam flanges 114 and are engaged with the inner sides of such flanges by turning of the handle 103 to move the lugs 115 past outturned entry lips 117 at the outer ends of the cam flanges. Continued turning of the handle 103 moves the lugs 115 down along the inner faces of the cam flanges 114 to draw the cover axially inwardly until the handle 103 has been turned approximately 180°, whereupon the latching lugs 115 engage against axially inwardly directed stop flanges 118 provided at the inner or lower ends of the cam flanges 114. At the same time, the latching lugs 115 snap into respective offset interlock recesses 119 provided in the cam flanges 114 immediately adjacent to the stop lug flanges 118. This interengagement of the latching lugs 115 within the interlock depressions or recesses 119 prevents unintentional turning of the latching mechanism out of the tensioned cover take-up relationship thereof to the adapter post member 105.

For releasing the cover from the wheel, the handle 103 is manipulated to stress the latching lugs 115 out of the interlock recesses 119 and then turn the lugs out of engagement with the cam flanges 114 until they are released and the cover can be removed axially outwardly away from the wheel.

It will be appreciated that the latching mechanism of Figures 8 and 9 may be used with any of the covers described herein.

It will be understood that modifications and variations may be effected without departing from the scope of the novel concepts of the present invention.

I claim as my invention:

1. In a cover for disposition at the outer side of a vehicle wheel having a tire rim, a sheet metal cover body having an annular portion divided into a plurality of radially extending flexible strips providing spokes integrally joined by a continuous outer annular marginal portion, said spokes having adjacent to said marginal portion radially outwardly facing and axially inwardly directed shoulders engageable under resilient tension against a flange of a tire rim.

2. In a wheel structure including a wheel body and tire rim having a multi-flange construction, a cover for disposition at the outer side of the wheel comprising a cover body including an axially moveable crown portion joined to an intermediate portion which is axially flexibly deflectable and joins a substantially rigid annular margin at an inwardly directed and radially outwardly facing shoulder engageable wedgingly against a radially inwardly facing flange of a tire rim, and means for axially inwardly deflecting the crown portion to place said intermediate portion under tension thrusting toward said shoulder.

3. In a wheel structure including a wheel body and a tire rim, a cover for disposition at the outer side of the wheel comprising a cover body having an axially flexibly deflectable inner portion joined to a generally radially outwardly extending shoulder portion engageable with a radially inwardly facing flange of a tire rim and being relatively radially movable within limits, said cover having a marginal portion axially and radially outwardly beyond said shoulder and engageable in axially inward limiting relation against the tire rim, and means for axially inwardly deflecting said inner portion of the cover to exert radial outward thrust against said shoulder for wedging the shoulder against said radially inwardly facing tire rim flange.

4. In a wheel structure including a tire rim having a generally radially inwardly facing flange, a cover for disposition at the outer side of the wheel comprising a shoulder structure directed toward said flange and a portion engageable against the tire rim to delimit axially inward disposition of the shoulder, the cover having an inner portion joining said shoulder and disposed in flexibly deflectable thrust leverage relation to the shoulder for thrusting said shoulder against said tire rim flange as an incident to axial deflectional movement of said inner cover portion.

5. In a wheel structure including a wheel body and a multi-flange tire rim including an intermediate flange and a terminal flange joining the same, a cover for disposition at the outer side of the wheel comprising a crown portion, an intermediate portion and a marginal portion, said marginal portion having a fulcrum part engageable against said terminal flange adjacent to the intermediate flange and limiting axially inward movement of the cover on the wheel, said marginal and intermediate portions having a juncture portion providing a radially outwardly directed shoulder opposing the intermediate flange, and means carried by the wheel and arranged to place the crown portion of the cover under inwardly axial deflection to place said intermediate portion under axial deflection and radially outward thrust against said shoulder to drive the shoulder into wedging engagement with the intermediate flange of the tire rim.

6. In a wheel structure including a wheel body and a multi-flange tire rim including an intermediate flange and a terminal flange joining the same, a cover for disposition at the outer side of the wheel comprising a crown portion, an intermediate portion and a marginal portion, said marginal portion having a fulcrum part engageable against said terminal flange adjacent to the intermediate flange and limiting axially inward movement of the cover on the wheel, said marginal and intermediate portions having a juncture portion providing a radially outwardly directed shoulder opposing the intermediate flange, and means carried by the wheel and arranged to place the crown portion of the cover under inwardly axial deflection to place said intermediate portion under axial deflection and radially outward thrust against said shoulder to drive the shoulder into wedging engagement with the intermediate flange of the tire rim, said means carried by the wheel body including an adapter post and a crown portion of the cover having a latching mechanism releasably interengageable with said adapter post.

7. In a sheet metal cover for disposition at the outer side of a vehicle wheel having a multi-flange tire rim, a cover body having an inner axially resiliently flexibly deflectable portion, a marginal portion providing a stop engageable against the outer side of a part of a vehicle tire rim, and a generally axially extending and radially outwardly facing shoulder portion engageable with a radially inwardly facing flange of the tire rim upon axial deflection of the inner portion of the cover after engagement of said stop portion with the tire rim, said cover portions comprising integrally connected parts formed without separation from one piece of sheet metal.

8. In a cover for disposition at the outer side of a vehicle wheel having a tire rim, a cover having a plurality of radially extending flexible spoke-like portions having shoulder formation directed generally radially outwardly and engageable under resilient radial thrust against a radially inwardly facing flange of a tire rim, each of said spoke-like portions having means thereon at said shoulder formation for bitingly engaging the tire rim flange to hold the cover against turning.

9. In a cover for disposition at the outer side of a vehicle wheel having a tire rim, a cover body having a radially facing thrust shoulder adjacent the margin and engageable with a radially inwardly facing tire rim flange, said thrust shoulder having a series of slots therethrough, and means at said slots projecting from the thrust shoulder for biting engagement with said tire rim flange to hold the cover against turning.

10. In a wheel structure including a wheel body and a tire rim carried thereby, a cover for disposition at the outer side of the wheel comprising an outer cover portion engageable against the tire rim, an inner portion of substantially rigid structure, and an intermediate sheet metal portion separated into a plurality of generally radially extending connecting strips between the outer and inner portions, said strips being flexible, said wheel body and said inner cover portion having means for drawing the inner cover portion axially inwardly in assembly with the wheel to place said strips under tensioned flexure.

11. As an article of manufacture, an elongated adapter member for attachment in axially outwardly extending relation to the center portion of a vehicle wheel in order to enable central attachment of a cover to the wheel, said adapter member comprising a generally axially extending body portion having at its axially inner end means for attachment to a wheel and means at its axially outer end for engagement with cover retaining means, said outer end means comprising a pair of diametrically opposite generally radially extending and axially inwardly facing spiral cam flanges having axially outer ends engageable by retaining lugs of a cover connector and sloping spirally axially inwardly therefrom.

12. As an article of manufacture, an elongated adapter member for attachment in axially outwardly extending relation to the center portion of a vehicle wheel in order to enable central attachment of a cover to the wheel, said adapter member comprising a generally axially extending body portion having at its axially inner end means for attachment to a wheel and means at its axially outer end for engagement with cover retaining means, said outer end means comprising a pair of diametrically opposite generally radially radially extending and axially inwardly facing spiral cam flanges having axially outer ends engageable by retaining lugs of a cover connecter and sloping spirally axially inwardly therefrom, the axially inner ends of said flanges having respective axially inwardly directed stop flanges intersectingly related to said axially inwardly directed cam faces of the cam flanges.

13. As an article of manufacture, an elongated adapter member for attachment in axially outwardly extending relation to the center portion of a vehicle wheel in order to enable central attachment of a cover to the wheel, said adapter member comprising a generally axially extending body portion having at its axially inner end means for attachment to a wheel and means at its axially outer end for engagement with cover retaining means, said outer end means comprising a pair of diametrically opposite generally radially extending and axially inwardly facing spiral cam flanges having axially outer ends engageable by retaining lugs of a cover connecter and sloping spirally axially inwardly therefrom, the axially inner end portions of the cam flanges having axially outwardly offset interlock depressions therein interlockingly receptive of the lugs of a cover connecter.

14. In a cover for disposition at the outer side of a vehicle wheel, a cover plate having a central aperture, a rotary handle member of sheet metal having an axially outwardly facing outer surface with a central opening defined by an axially inwardly directed flange extending through said central opening of the cover, and means including structure for closing said opening and structure supported within said flange for engagement with cover retaining structure on a wheel by rotating the flange through the medium of the handle.

15. In a cover for disposition at the outer side of a vehicle wheel, a cover plate having a central aperture, a rotary handle member of sheet metal having an axially outwardly facing outer surface with a central opening defined by an axially inwardly directed flange extending through said central opening of the cover, and means supported within said flange for engagement with cover retaining structure on a wheel by rotating the flange through the medium of the handle, said means comprising a barrel-like member closing said central opening in the handle and carrying at its inner end portion radially outwardly extending lugs interengageable with a flange on a cover retaining structure on a wheel.

16. In a wheel structure including a wheel body and a multi-flange tire rim supported thereby and having an annular generally radially inwardly facing flange, a cover for disposition over the outer side of the wheel including a portion to extend from overlying relation to the wheel body into overlying relation to the tire rim and providing an annular sheet metal area divided into a plurality of generally radially extending flexible strips providing spoke-like portions integrally joined by a continuous outer annular marginal portion of the cover, the cover having adjacent juncture of said spoke-like portions with said marginal portion generally radially outwardly facing and generally axially inwardly directed shoulder structure engageable under resilient tension against said radially facing tire rim flange.

17. In a wheel structure, a wheel having central and flanged peripheral portions, a central cover portion including a relatively rigid rotatable cover part, an outer peripheral cover part overlying said flanged wheel portion, and radially extending resiliently flexible sheet metal strips disposed between said parts, said central rotatable part being attachable to the wheel and rotatable to thereby tension said strips in the securement of the cover parts to the wheel.

References Cited in the file of this patent

UNITED STATES PATENTS

| | | |
|---|---|---|
| 1,985,908 | Zerk | Jan. 1, 1935 |
| 2,042,774 | Ferro | June 2, 1936 |
| 2,130,207 | Van Halteren | Sept. 13, 1938 |
| 2,159,881 | Booth | May 23, 1939 |
| 2,308,617 | Lyon | Jan. 19, 1943 |
| 2,329,945 | Schatzman | Sept. 21, 1943 |

FOREIGN PATENTS

| | | |
|---|---|---|
| 415,681 | Great Britain | Aug. 30, 1934 |
| 526,576 | Great Britain | Sept. 20, 1940 |
| 714,587 | France | Sept. 7, 1931 |